Dec. 12, 1961 W. W. VIEAUX 3,012,351
FISHING NET
Filed April 14, 1960
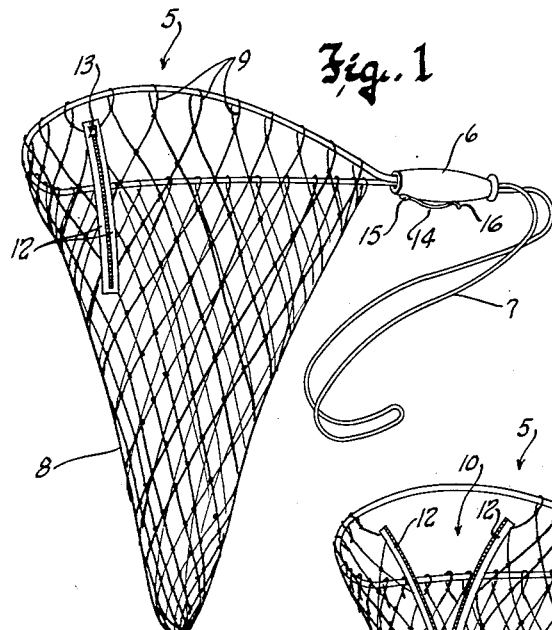
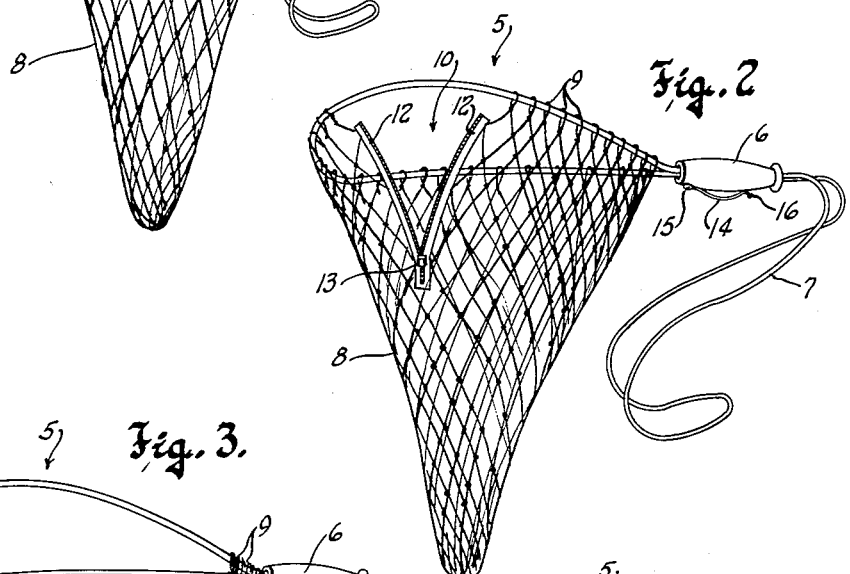
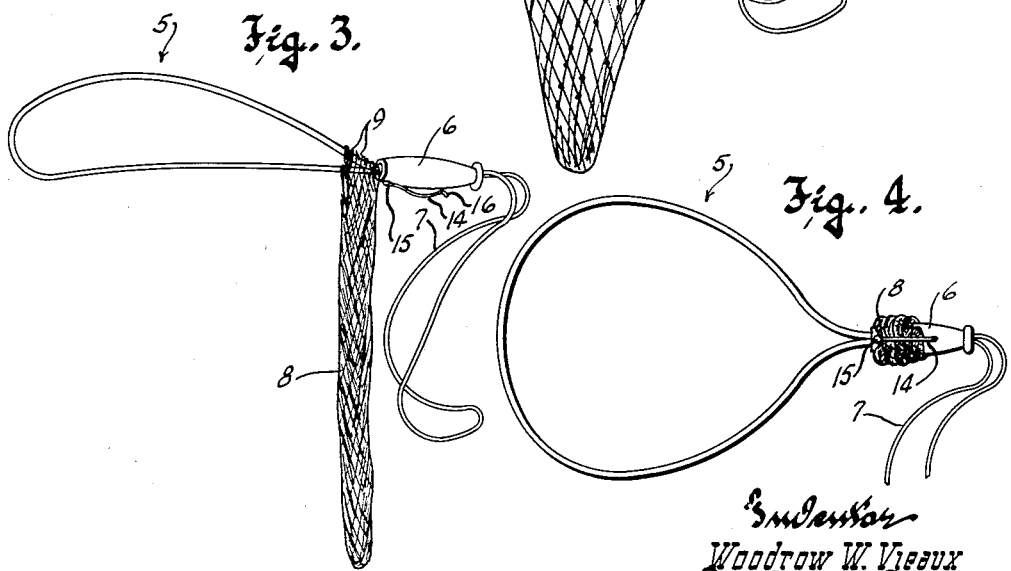
Inventor
Woodrow W. Vieaux United States Patent Office 3,012,351
Patented Dec. 12, 1961

3,012,351
FISHING NET
Woodrow W. Vieaux, 819 Lakeside Place,
Green Bay, Wis.
Filed Apr. 14, 1960, Ser. No. 22,355
8 Claims. (Cl. 43—12)

This invention relates to fishing nets, and has more particular reference to improvements in so-called landing nets.

Fishermen who find it either desirable or essential to carry a landing net have for long suffered considerable annoyance from the tendency of the mesh bag of the net to catch upon and become entangled with various objects encountered on fishing trips. This has proved to be the case regardless of whether the net is being transported in an automobile or carried about by the fisherman while moving from one fishing site to another.

Many attempts have been made to overcome this annoying characteristic of landing nets but no one has hitherto found a simple, inexpensive and satisfactory solution to the problem. by way of example, most proposals heretofore submitted as an answer to this problem relied upon very complicated structures that had to be collapsed or knocked down in order to provide protection against snagging the mesh bag of the net. Not only were such collapsible net structures excessively costly to produce but they left much to be desired from the standpoint of rigidity and reliability during use of the net, and they were apt to require an excessive amount of time and effort on the part of fishermen desiring to assemble the net for use or to disassemble it for storage and/or transportation.

It is a purpose of this invention, therefore, to provide a landing net which is so constructed as to enable its fish receiving bag to be quickly and easily disposed in either an operative position of use or an inoperative transporting and storage position at which the bag is compactly stowed in substantially snag-free condition on a part of the net where there will be little or no likelihood of the bag catching on or becoming entangled with various objects that may come into contact with the net during transportation thereof from place to place.

More specifically it is the purpose of this invention to provide a landing net for fishermen featuring a handle, a rigid annular frame on one end of the handle and a mesh bag suspended at its open top from the frame but fashioned to enable the bag to be moved along the frame from an operative fish receiving position to an inoperative position at which the entire bag is disposed alongside the handle and can be wrapped thereabout and thereafter releasably secured to the handle for compact storage thereon.

Stated in another way, it is an object of the invention to provide a fisherman's landing net featuring a flexible fish receiving bag having its open top loosely connected to the frame of the net and having a placket in one side thereof to enable top portions of the bag at either side of the placket to be moved relatively to one another along the frame to a position where the entire bag is disposed adjacent to the handle and may be wrapped thereabout for storage, and wherein readily releasable closure means is provided to close the placket and normally hold the bag in its fish receiving position on the frame.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

FIGURE 1 is a perspective view of a landing net embodying this invention, showing the bag thereof in its operative, fish receiving position;

FIGURE 2 is a perspective view similar to FIGURE 1 but showing how the bag may be released for sliding movement along the frame to an inoperative position adjacent to the handle of the net;

FIGURE 3 is a perspective view showing the entire bag disposed entirely to one side of the frame and adjacent to its junction with the handle; and FIGURE 4 is a plan view of the net showing the fish receiving bag compactly wrapped about the handle for transportation and/or storage.

Referring now more particularly to the accompanying drawing, in which like reference characters have been applied to like parts throughout the views, the numeral 5 generally designates a substantially annular frame, secured to one end of a handle 6. The frame 5 is rigid, and as is conventional, may be bent into nearly circular form from a length of aluminum tubing or the like, with the opposite ends of the tubing left in straight condition so that they may be projected into the handle 6 for securement therein. A cord 7, arranged in the form of a loop, may be secured in the end of the handle remote from the frame to facilitate carrying the net and to guard against accidental loss thereof during use.

The frame and handle construction described, of course, are more or less conventional.

The annular frame 5 supports and provides the mouth of a flexible fish receiving mesh bag 8. The bag has an open top around the periphery of which the annular frame member 5 extends, and which is loosely connected to the frame as by means of loops 9. These loops are shown as integral parts of the cord from which the bag is formed, but it will be appreciated that the loops may be provided by metal or plastic rings or snaps loosely encircling the frame and attached in any suitable fashion to the open upper end of the bag.

According to this invention, the fish receiving bag 8 is provided with a placket 10 in one side portion thereof, opening to the top of the bag and extending downwardly therefrom a distance sufficient to enable top portions of the bag at opposite sides of the placket to be spread apart relatively to one another along the frame and disposed adjacent to the junction of the frame and the handle 6. This means, of course, that the opening in the bag provided by the placket 10 must be large enough to enable the main portion of the frame outwardly of the handle to be passed through the placket opening.

Any suitable fastening or closure means may be employed to releasably close the placket 10 and normally hold the bag in its fish receiving position beneath the frame; buttons, snap fasteners or hook and eye connectors being satisfactory for that purpose. However, it is a further feature of this invention that the placket is provided by the opposite tapes 12 of a slide fastener of the "zipper" type having a slide 13 which, when drawn upwardly from the substantially open position of the placket shown in FIGURE 2, closes the placket and secures the bag in its operative position on the annular frame 5 in the manner illustrated in FIGURE 1. When the slide 13 is pulled downwardly to the bottom of the placket to fully open the same, the top portions of the bag adjacent to the placket may be moved relatively to one another along the frame to its junction with the handle, to dispose the entire bag at one side of the frame and adjacent to the forward end of the handle, as seen in FIGURE 3. When in that position, the bag may be conveniently and compactly wrapped about the front portion of the handle and, if desired, releasably secured in a tight bun thereupon by insertion of a bottom portion of the bag under one or more of the wrappings of the bag therebeneath.

As shown, however, the handle is provided with a retaining member 14 in the form of a spring finger which lengthwise overlies the front portion of the handle and has its forward end suitably secured thereto as by a rivet 15. The finger is biased toward the handle, and its free rear end portion 16 is curved outwardly away from the handle to facilitate sliding the folds of the bag thereunder to the compact storage position on the front portion of the handle seen in FIGURE 4.

This disposition of the bag more or less protects it from snagging upon various objects either during transportation of the net from place to place or while the net is carried about by a fisherman.

The placket 10 is preferably located in a side of the mesh bag 8 which is remote from the handle 6, as shown, so that when the slide fastener is drawn downwardly to fully open the placket, both top portions of the bag adjacent to the placket may be slid around the opposite sides of the frame to its junction with the handle, to enable the bag to be compactly wrapped about the handle for safe storage.

To ready the net for use, the bag may be quickly unwrapped from its storage position on the handle and its placketed portions slid forwardly along the frame to the front thereof to a position at which the slid 13 of the fastener may be pulled up to close the placket and thus cause the bag to be maintained in its operative position beneath and aligning with the annular frame 5.

From the foregoing description, taken together with the accompanying drawing, it will be readily apparent to those skilled in the art that this invention provides a simple and inexpensive but highly satisfactory solution to the problem of preventing the bag of a fisherman's landing net from snagging upon or becoming entangled with various objects that might come into contact with the net when it is not in actual use, and that this objective is attained without in anywise departing from a more or less conventional construction for the frame and handle of the net.

What is claimed as my invention is:

1. A fishing net, comprising: a handle; means on one end of the handle providing an annular frame; a flexible bag having an open top; loop means loosely pendantly connecting the top of the bag to the annular frame so that the frame normally holds the top of the bag open and defines the mouth thereof; means defining a placket in a side of the bag, opening to the top thereof, and extending downwardly from the frame a distance sufficient to allow relative displacement of bag portions at opposite sides of the placket entirely around the frame to its junction with the handle so that the bag may be wrapped about the handle for compact storage; and releasable closure means for said placket normally holding said bag portions at opposite sides of the placket against relative displacement.

2. The fishing net of claim 1, wherein said placket is in that side portion of the bag which is remote from the handle and, when open, enables the bag portions at both sides thereof to be displaced along opposite sides of the frame to its junction with the handle, thus disposing the bag entirely to one side of the frame and in a position at which it may be conveniently and compactly wrapped about the handle for storage.

3. The fishing net of claim 1, wherein said releasable closure means comprises a slide fastener.

4. The fishing net of claim 1, wherein said placket is provided by the opposite tapes of a slide fastener.

5. An article of manufacture, a flexible fish receiving bag for a landing net characterized by the provision of: means defining a placket in a side portion of the bag extending a distance downwardly from the open top of the bag; and releasable closure means for said placket.

6. As an article of manufacture, a mesh bag for a landing net, characterized by: a slide fastener in one side portion of the bag, extending downwardly a substantial distance from the open top of the bag, the opposite tapes of said fastener providing a placket in the bag.

7. The fishing net of claim 1, further characterized by the provision of a bag retaining member carried by the handle, for releasably holding the bag in said compact storage position upon the handle.

8. The fishing net of claim 7, wherein said retaining member comprises a spring finger secured at one end to the handle and extending lengthwise therealong, said spring finger being engageable over the folds of the bag wrapped about the handle to releasably hold the bag in a tight bun thereon.

References Cited in the file of this patent

UNITED STATES PATENTS 2,921,397     Luthi                 Jan. 19, 1960